(12) United States Patent
Jo et al.

(10) Patent No.: US 10,969,081 B2
(45) Date of Patent: Apr. 6, 2021

(54) MULTI-SIDED LUMINOUS LIGHTING MEMBER AND THREE-DIMENSIONAL LIGHTING DEVICE USING SAME

(71) Applicants: EXAOPTONIX INC., Gyeonggi-do (KR); UTRONIX INC., Gyeonggi-do (KR)

(72) Inventors: Ho Jun Jo, Busan (KR); Keun Young Yang, Gyeonggi-do (KR); Woo Seok Choi, Gyeonggi-do (KR)

(73) Assignees: EXAOPTONIX INC., Gyeonggi-do (KR); UTRONIX INC., Gyeonggi-do (KR)

( * ) Notice: Subject to any disclaimer, the term of this patent is extended or adjusted under 35 U.S.C. 154(b) by 0 days.

(21) Appl. No.: 16/615,312

(22) PCT Filed: Jun. 29, 2018

(86) PCT No.: PCT/KR2018/007397
§ 371 (c)(1),
(2) Date: Nov. 20, 2019

(87) PCT Pub. No.: WO2019/013479
PCT Pub. Date: Jan. 17, 2019

(65) Prior Publication Data
US 2020/0173626 A1 Jun. 4, 2020

(30) Foreign Application Priority Data
Jul. 12, 2017 (KR) .................. 10-2017-0088351

(51) Int. Cl.
*F21S 43/249* (2018.01)
*F21S 43/14* (2018.01)
(Continued)

(52) U.S. Cl.
CPC .......... *F21S 43/249* (2018.01); *B60Q 1/2696* (2013.01); *F21S 41/30* (2018.01);
(Continued)

(58) Field of Classification Search
CPC .......... F21S 43/249; F21S 41/30; F21S 41/24; F21S 43/14; F21K 9/61; G02B 6/0036;
(Continued)

(56) References Cited

U.S. PATENT DOCUMENTS

| | | | |
|---|---|---|---|
| 2003/0086276 A1* | 5/2003 | Ohtsuka | B60Q 1/2696 362/511 |
| 2005/0111235 A1* | 5/2005 | Suzuki | F21S 43/14 362/555 |

(Continued)

FOREIGN PATENT DOCUMENTS

| | | |
|---|---|---|
| CN | 103423686 A | 12/2013 |
| DE | 102010061210 A1 | 6/2012 |

(Continued)

OTHER PUBLICATIONS

Korean Patent Abstract (in English) of Korean Patent App. Pub. No. KR10-2014-0131897-A, Pub. Date Nov. 14, 2014, downloaded Nov. 15, 2019, from https://worldwide.espacenet.com.

(Continued)

*Primary Examiner* — Joseph L Williams
*Assistant Examiner* — Jose M Diaz
(74) *Attorney, Agent, or Firm* — Barcelo, Harrison & Walker, LLP

(57) ABSTRACT

Disclosed are: a multi-sided luminous lighting member which is mounted to a structure having a complex three-dimensional shape, such as an automobile, so as to be used for the purpose of lighting, signaling, decoration, and the like; and a three-dimensional lighting device using the same. The lighting member according to an aspect of the present (Continued)

invention is a light-transmitting light guide member having a plurality of light emitting surfaces and comprises: a light guide member having a light incident portion which is at least one of the plurality of light emitting surfaces, a first light exit portion which is at least one other surface opposite to the light incident portion among the plurality of light emitting surfaces, and a second light exit portion which is at least one other surface placed laterally in the direction in which light incident to the light incident portion travels toward the first light exit portion, wherein light incident to the light incident portion is emitted from the first light exit portion and the second light exit portion; at least one light emitting diode disposed adjacent to the light incident portion such that light is incident to the light incident portion; and a mounting board for mounting the at least one light emitting diode on the surface thereof, the mounting board being connected to the light guide member.

15 Claims, 19 Drawing Sheets

(51) Int. Cl.
 *F21S 41/30* (2018.01)
 *B60Q 1/26* (2006.01)
 *F21Y 101/00* (2016.01)
 *B60Q 1/30* (2006.01)

(52) U.S. Cl.
 CPC ............... *F21S 43/14* (2018.01); *B60Q 1/30* (2013.01); *F21Y 2101/00* (2013.01)

(58) Field of Classification Search
 CPC ...... G02B 6/0045; B60Q 1/2696; B60Q 1/30; F21Y 2101/00
 See application file for complete search history.

(56) References Cited

U.S. PATENT DOCUMENTS

| | | | |
|---|---|---|---|
| 2009/0129119 A1 | 5/2009 | Lee et al. | |
| 2009/0207631 A1* | 8/2009 | Isoda | G02B 6/005 362/619 |
| 2010/0123858 A1 | 5/2010 | Han et al. | |
| 2011/0110111 A1 | 5/2011 | Rho | |
| 2013/0314946 A1* | 11/2013 | Wilson | F21S 43/241 362/612 |
| 2016/0047969 A1* | 2/2016 | Lim | G02B 6/0036 362/612 |
| 2017/0113603 A1* | 4/2017 | Shin | F21S 43/26 |
| 2019/0049088 A1* | 2/2019 | Sakashita | G02B 6/0035 |

FOREIGN PATENT DOCUMENTS

| | | |
|---|---|---|
| JP | 4586729 B2 | 12/2010 |
| KR | 200444467 Y | 5/2009 |
| KR | 20140131897 A | 11/2014 |
| KR | 20150082671 A | 7/2015 |
| KR | 20170073324 A | 6/2017 |
| WO | 2011019785 A1 | 2/2011 |

OTHER PUBLICATIONS

Korean Patent Abstract (in English), from Wo-2008/040323-A2, that corresponds to Korean Patent App. Pub. No. KR10-2015-0082671-A, Pub. Date Jul. 15, 2015.
Korean Patent Abstract (in English) of Korean Utility Model Registration No. KR20-0444467-Y, Reg. Date May 6, 2009.
Japanese Patent Abstract (in English) of Japanese Patent App. Pub. No. JP4583729-62, Pub. Date Dec. 1, 2010, downloaded Nov. 15, 2019, from https://worldwide.espacenet.com.
Korean Patent Abstract (in English) of Korean Patent App. Pub. No. KR10-2017-0073324-A, Pub. Date Jun. 28, 2017.
Office Action (in Korean) for KR Patent Application No. KR10-2017-0088351 dated Sep. 27, 2017.
German Patent Abstract (in English) of German Patent App. Pub. No. DE102010061210 (A1), Pub. Date Jun. 14, 2012, downloaded May 15, 2020, from https://worldwide.espacenet.com.
International Preliminary Report (in English), PCT application No. PCT/KR2018/007397, dated Jan. 14, 2020.
Supplementary European Search Report (in English), Application No. EP 18 832 391.9, dated Mar. 27, 2020.
Extended European Search Report (in Engiish), Application No. EP 16 832 391.9, Reference Report: MM 58864, dated Apr. 9, 2020.
Chinese Patent Abstract (in English) of Chinese Patent App. Pub. No. CN103423686 (A), Pub. Date Dec. 4, 2013, downloaded Jul. 14, 2020, from https://worldwide.espacenet.com.
Office Action (in Chinese) for Chinese Patent Application No. CN201880028959.2 dated Jul. 13, 2020.

* cited by examiner (a)

(b)

(a)

(b)

(a)  (b)

(a)

(b)

(a)                                      (b)

MULTI-SIDED LUMINOUS LIGHTING MEMBER AND THREE-DIMENSIONAL LIGHTING DEVICE USING SAME

CROSS-REFERENCE TO RELATED APPLICATIONS

This application is the national stage for International Patent Cooperation Treaty Application PCT/KR2018/007397, filed on 29 Jun. 2018, which claims priority from Korean Patent Application No. 10-2017-0088351, filed on 12 Jul. 2017, in the Korean Intellectual Property Office. The entire contents of said applications are incorporated herein by reference for all purposes.

BACKGROUND

Technical Field

The present invention relates to a multi-sided luminous lighting member and a three-dimensional lighting device using the same, and more particularly, to a multi-sided luminous lighting member which is mounted to a structure having a three-dimensional shape, such as an automobile, so as to be used for the purpose of lighting, signaling, decoration, and the like, and a three-dimensional lighting device using the same.

Background Art

Various types of lamp assemblies are used inside and outside an automobile. In general, a lamp assembly for an automobile has a lighting function for assisting a driver in recognizing an object with the naked eye at night or in bad weather where there is a lack of natural light, and the lamp assembly has a signaling function for indicating a state of the automobile to the outside. For example, headlamps or fog lamps mainly serve to provide lighting, and turn signal lamps, tail lamps, and brake lamps mainly serve to provide signals. In addition, various lamp assemblies are installed inside/outside the automobile and used to indicate a position of a particular manipulating device or used for the purpose of decoration or indication of a state of the automobile.

In comparison with light sources in the related art, a light-emitting diode (LED) has lots of advantages in that the light-emitting diode does not use harmful substances such as mercury and thus causes less environmental pollution, and the light-emitting diode has a long lifespan, low electric power consumption, and excellent visibility, and causes less light blindness. Recently, the LEDs are widely used for lighting devices for automobiles in accordance with rapid developments of technologies associated with the LEDs such as high-brightness light-emitting diodes.

For example, Korean Patent Application Laid-Open No. 2014-0131897 discloses a point-light-emitting type auxiliary brake lamp 3 for an automobile 1 that uses LEDs as illustrated in FIGS. 1A and 1B, in which a plurality of LEDs 4 is disposed to be spaced apart from one another or disposed in groups so as to ensure a lighting width of the auxiliary brake lamp which is a predetermined standard or higher determined by the related regulations.

However, in this related art, the amount of light greatly varies depending on positions on surfaces of the LEDs on the brake lamp because the arrangement positions of the plurality of LEDs directly affect a light emitting pattern of the brake lamp which is recognized from the outside. For this reason, only particular points, where the respective LEDs are positioned, are conspicuously and visually recognized in the form of local point light sources when viewing the brake lamp from the rear side, but linear light sources or surface light sources, which have entirely uniform light emitting patterns, cannot be implemented. If arrangement intervals are decreased by increasing the number of LEDs to avoid the above-mentioned problems, there is a problem in that component costs increase. There is also a problem in that the component costs, the number of components, and an overall module thickness also increase even if a diffusion plate or the like is disposed on the surface.

In addition, with the development of automobile culture, various types of automobiles have been launched, and technologies have been leveled up to implement essential functions related to automobile traveling. Therefore, in order to ensure competitiveness in the market, design factors or emotional factors also tend to be emphasized in addition to functional factors, and the lighting device for an automobile is a very important factor for expressing personality or characteristics of the automobile.

In particular, recently, an attempt has been made to implement a lighting device having various and more luxurious shapes by using a lighting structure having a three-dimensional light emitting pattern. However, only with a single light source module mounted with one or more LEDs which are point light emitting elements emitting light that travels straight in a direction, it is not easy to effectively implement the lighting structure having a three-dimensional light emitting pattern. In this regard, as illustrated in FIG. 2A, a lighting structure having a three-dimensional light emitting pattern is sometimes implemented by three-dimensionally arranging several light source modules and coupling the respective light source modules to members having different properties and effects. However, there is a limitation in that the implemented lighting structure is not greatly different from a lighting structure in the related art because the three-dimensional light emitting pattern cannot be appropriately implemented due to a very complicated structure, a high unit price, and a mechanical limitation.

Recently, as illustrated in FIG. 2B, there is an attempt made to implement a lighting structure having a three-dimensional light emitting pattern by using an organic light emitting diode (OLED) panel in order to solve the above-mentioned problem. However, when using the organic light emitting diode (OLED) panel, the manufacturing costs may be greatly increased, a separate light source needs to be added because it is difficult to adjust a light amount reference value required for a brake lamp (stop lamp) and the like, and it is difficult to satisfy high reliability required for an automobile and the like, and thus there remain a lot of problems to be solved.

DISCLOSURE

Technical Problem

The present invention has been made in an effort to solve the above-mentioned problem and to provide a multi-sided luminous lighting member which is easily applied to an automobile having a complex three-dimensional structure and may implement a multi-sided light emitting structure including a surface light source together with an ideal linear light source having a uniform light emitting pattern, and a three-dimensional lighting device using the same.

The present invention has also been made in an effort to provide a multi-sided luminous lighting member which may reduce manufacturing costs, may be easily applied without worry in view of component costs and component complexity even though designs of automobiles are changed by automobile manufacturers or new automobile designs are made, and may improve versatility as an automobile component, and a three-dimensional lighting device using the same.

The present invention has also been made in an effort to provide a basic material/component infrastructure capable of being utilized to easily implement various high-grade designs by automobile manufacturers by supplying lighting members which are modularized and light in weight and have flexibility.

Technical Solution

A lighting member according to an aspect of the present invention includes: a light guide member which is a multi-sided light-transmitting light guide member having a plurality of surfaces and has a light incident portion which is at least one of the plurality of surfaces, a first light exit portion which is at least one other surface opposite to the light incident portion among the plurality of surfaces, and a second light exit portion which is at least one other surface positioned laterally in a direction in which light entering the light incident portion travels toward the first light exit portion, such that the first light exit portion and the second light exit portion emit the light that has entered the light incident portion; a plurality of light emitting diodes disposed at predetermined intervals adjacent to the light incident portion to allow the light to enter the light incident portion; and a mounting board connected to the light guide member and having a surface on which the plurality of light emitting diodes are disposed, in which a concave-convex portion is formed on a surface of the first light exit portion to mitigate irregularity of a light emitting pattern on the first light exit portion which is caused by the intervals between the plurality of light emitting diodes at the light incident portions.

In this case, the light guide member may include a light guide film, the light incident portion may include one edge surface of the light guide film, the first light exit portion may implement a linear light source, and the second light exit portion may implement a surface light source.

In addition, a predetermined pattern may be formed on a surface of the second light exit portion to emit a part of the light that enters the light incident portion and travels toward the first light exit portion.

Further, a pattern may be formed on a surface of the second light exit portion so that a brightness difference is made in a particular direction.

In addition, the lighting member may further include a bezel portion attached to an upper or lower surface of the light guide member, in which the bezel portion adjusts a light emitting pattern on the second light exit portion by using one or more of shape, color, and surface treatments.

In this case, the bezel portion may fix the light guide member and the mounting board.

In addition, the bezel portion may have a reflective surface configured to reflect the light exiting the second light exit portion.

In addition, the light guide member may be a light guide film having a thickness of 0.1 mm to 4.0 mm.

In addition, the light guide member may be an injection-molded light guide film having a thickness of 2.0 mm to 20.0 mm.

In addition, the light incident portion may face the plurality of light emitting diodes, and the first light exit portion may be positioned at a side opposite to a side of the light incident portion on a plane of the light guide member.

In addition, concave-convex portions having one or two or more shapes may be repeatedly disposed at predetermined intervals on the surface of the first light exit portion.

In addition, a thickness of the light guide film at a side of the first light exit portion and a thickness of the light guide film at a side of the light incident portion may be different from each other.

In this case, the light guide film may have a tapered cross section, and a thickness of the light guide film at a side of the first light exit portion may be greater than a thickness of the light guide film at a side of the light incident portion.

In addition, the light guide film may include a curved portion bent at a predetermined angle.

A three-dimensional lighting device according to another aspect of the present invention may implement a three-dimensional light emitting pattern by arranging the plurality of lighting members.

In this case, the three-dimensional lighting device may further include a control unit capable of individually controlling and sequentially operating the plurality of arranged lighting members.

A method of manufacturing a lighting member according to still another aspect of the present invention includes: forming a light guide member which is a multi-sided light-transmitting light guide member having a plurality of surfaces and has a light incident portion which is at least one of the plurality of surfaces, a first light exit portion which is at least one other surface opposite to the light incident portion among the plurality of surfaces, and a second light exit portion which is at least one other surface positioned laterally in a direction in which light entering the light incident portion travels toward the first light exit portion, such that the first light exit portion and the second light exit portion emit the light that has entered the light incident portion; disposing a plurality of light emitting diodes at predetermined intervals on a mounting board adjacent to the light incident portion to allow the light to enter the light incident portion; coupling the light guide member to the mounting board having a surface on which the plurality of light emitting diodes is disposed; and connecting the mounting board to a drive module configured to electrically operate the plurality of light emitting diodes, in which a concave-convex portion is formed on a surface of the first light exit portion to mitigate irregularity of a light emitting pattern on the first light exit portion which is caused by the intervals between the plurality of light emitting diodes at the light incident portion.

In this case, in the forming of the light guide member, the light guide member may be formed by cutting and separating a flexible light-transmitting resin film.

In addition, in the forming of the light guide member, the light guide member may be formed by injection-molding light-transmitting resin.

Advantageous Effects

According to the present invention, it is possible to provide the multi-sided luminous lighting member which is easily applied to internal and external structures of an automobile having a complex three-dimensional structure and may implement a multi-sided light emitting structure including a surface light source together with an ideal linear light source having a uniform light emitting pattern, and a three-dimensional lighting device using the same.

In addition, according to the present invention, it is possible to provide the multi-sided luminous lighting member which may reduce manufacturing costs, may be easily applied without worry in view of component costs and component complexity even though designs of automobiles are changed by automobile manufacturers or new automobile designs are made, and may improve versatility as an automobile component, and a three-dimensional lighting device using the same.

In addition, according to the present invention, it is possible to provide the basic material/component infrastructure capable of being utilized to easily implement various high-grade designs for vehicle manufacturers by supplying the lighting members which are modularized and light in weight and have flexibility.

DETAILED DESCRIPTION

Best Mode

Figure 1A:
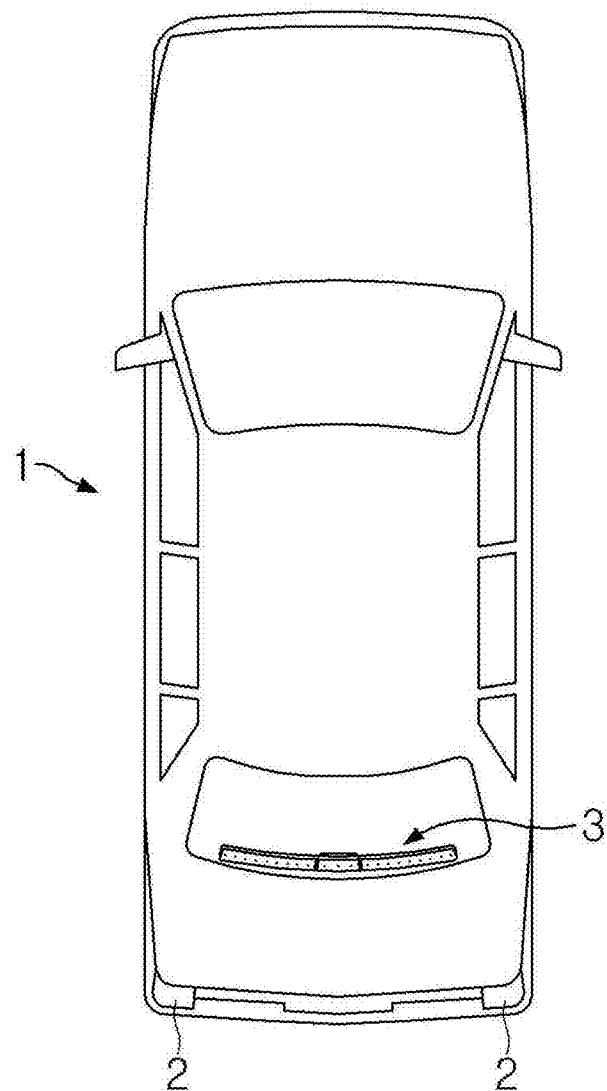
FIGS. 1A and 1B are views illustrating a point light emitting type auxiliary brake lamp using LEDs in the related art.
Figure 1B:
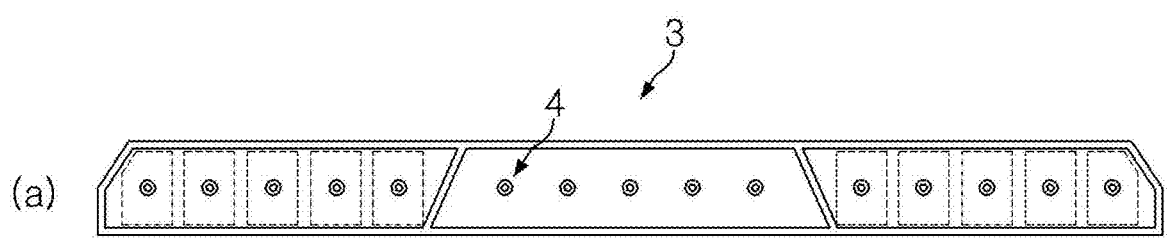
Figure 1B:
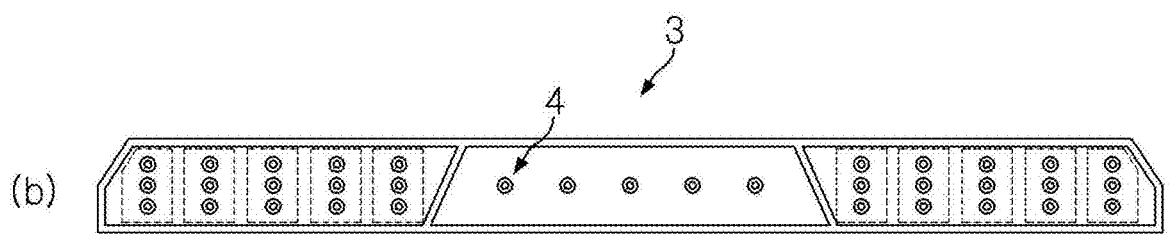
Figure 2:
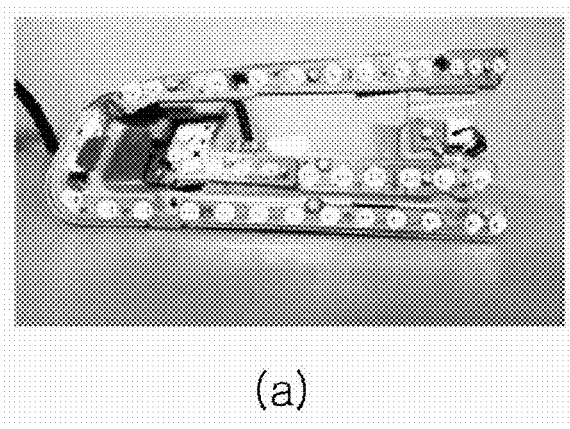
FIG. 2 is a view illustrating a lighting structure using a plurality of light source modules and an organic light emitting diode panel in the related art.
Figure 2:
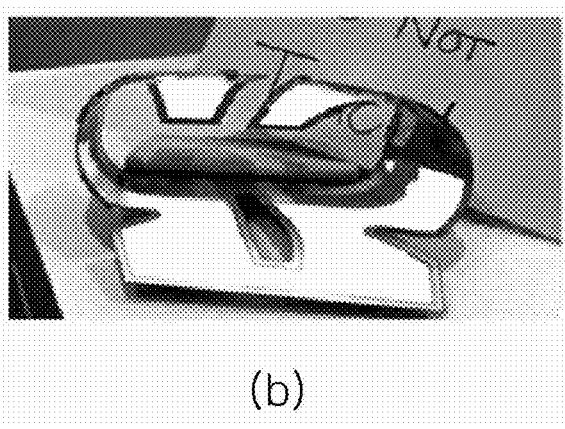

It should be noted that technical terms used in the present intention are used to just describe a specific exemplary embodiment and do not intend to limit the scope of the present invention. Further, unless the technical terms used in the present invention are particularly defined as other meanings in the present invention, the technical terms should be interpreted as meanings generally appreciated by those skilled in the art and should not be interpreted as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually and should not be interpreted as an excessively reduced meaning.

In addition, singular expressions used in the present invention include plural expressions unless clearly described as different meanings in the context. It should not be interpreted that the terms "comprises," "comprising," "includes" and/or "including," used herein necessarily include all of the several constituent elements or several steps disclosed in the present invention, and it should be interpreted that the terms do not include some of the constituent elements or steps and may further include additional constituent elements or steps.

The terms including ordinal numbers such as "first" and "second" used in the present invention may be used to describe constituent elements, but the constituent elements should not be limited by the terms. These terms are used only to distinguish one constituent element from another constituent element. For example, a first constituent element may be named a second constituent element, and similarly, the second constituent element may also be named the first constituent element, without departing from the scope of the present invention.

Hereinafter, the exemplary embodiments according to the present invention will be described in detail with reference to the accompanying drawings. The same or corresponding constituent elements are assigned with the same reference numerals regardless of reference numerals, and the repetitive description thereof will be omitted.

In addition, in the description of the present invention, the specific descriptions of publicly known related technologies will be omitted when it is determined that the specific descriptions may obscure the subject matter of the present invention. In addition, it should be noted that the accompanying drawings are provided only to allow those skilled in the art to easily understand the technical spirit of the present invention, and the technical spirit of the present invention should not be interpreted as being limited by the accompanying drawings.

Figure 3:
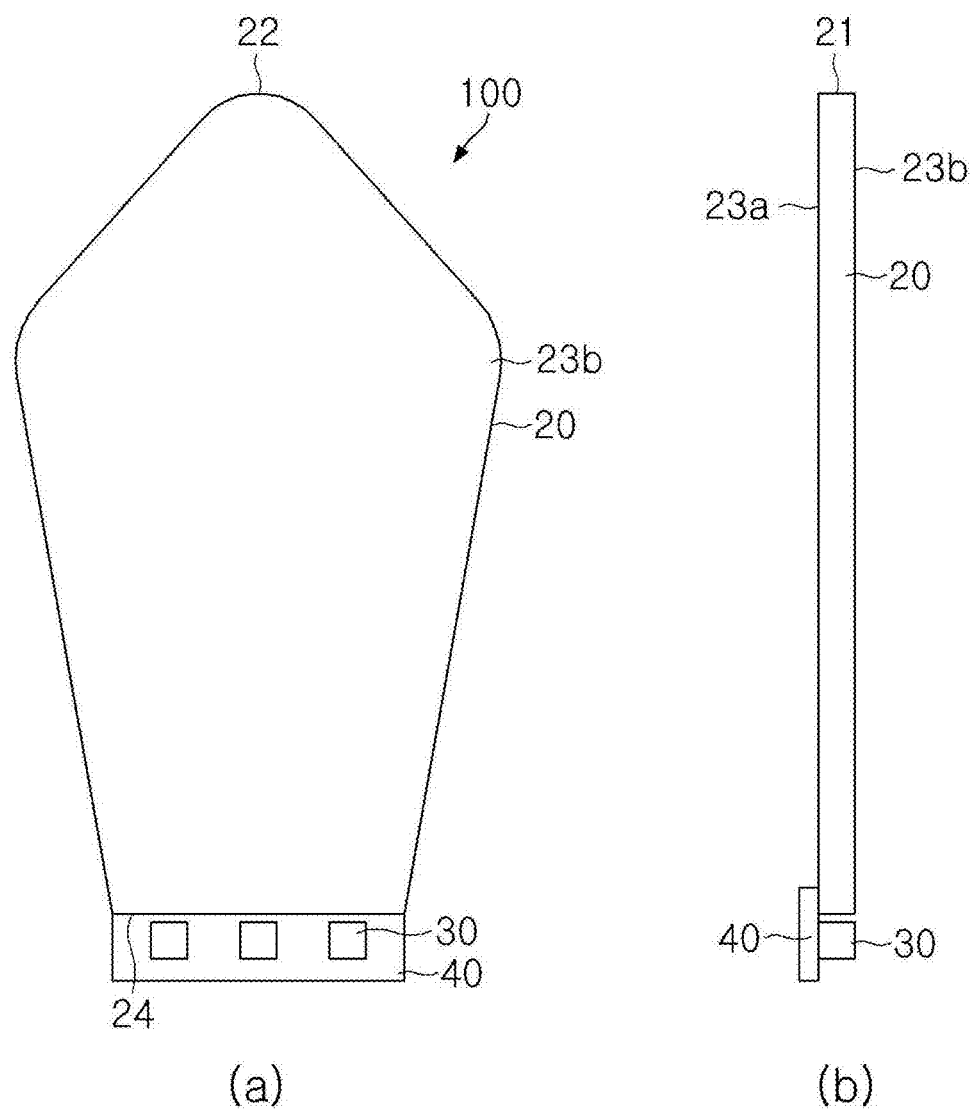
FIG. 3 is a view illustrating a multi-sided luminous lighting member according to an exemplary embodiment of the present invention.

FIG. 3 illustrates a multi-sided luminous lighting member 100 according to an exemplary embodiment of the present invention. As illustrated in FIG. 3, the multi-sided luminous lighting member 100 according to the exemplary embodiment of the present invention may include one or more light emitting diodes 30, a light guide member 20 configured to guide light entering from the one or more light emitting diodes 30 and allow the light to exit respective light emitting surfaces, and a mounting board 40 on which the one or more light emitting diodes 30 are mounted.

In this case, the light guide member 20 is a light-transmitting light guide member 20 having the plurality of light emitting surfaces and has a light incident portion 24 which is at least one of the plurality of light emitting surfaces, a first light exit portion 22 which is at least one other light emitting surface opposite to the light incident portion 24 among the plurality of light emitting surfaces, and a second light exit portion 23 which is at least one other light emitting surface positioned laterally in a direction in which the light entering the light incident portion 24 travels toward the first light exit portion 22. The first light exit portion 22 and the second light exit portion 23 emit the light that has entered the light incident portion 22.

In addition, the light emitting diode 30 is disposed adjacent to the light incident portion 24 and emits the light so that the light enters the light incident surface 22 of the light guide member 20. A side-view light emitting diode 30 may be used as the light emitting diode 30, but the present invention is not limited thereto, and a top-view light emitting diode 30 may also be used.

In addition, the one or more light emitting diodes 30 are disposed on a surface of the mounting board 40, and the mounting board 40 is structured to be connected to the light guide member 20. A general PCB (rigid type) may be used as the mounting board 40. Otherwise, the mounting board 40 may be implemented by using a metal PCB or using an aluminum plate for a flexible PCB in consideration of heat dissipation.

Therefore, the light, which is emitted from the one or more light emitting diodes 30 and enters the light incident portion 24, exits the first light exit portion 22 opposite to the light incident portion 24 as well as the second light exit portion 23 which is at least one other surface positioned laterally in the direction in which the light travels toward the first light exit portion 22. Accordingly, in the lighting member 100 according to the exemplary embodiment of the present invention, the light exits the first light exit portion 22 and the second light exit portion 23, thereby implementing a multi-sided light emitting property.

In addition, the light guide member 20 may include a light guide film. More specifically, the light-transmitting resin film, which is made of acrylic-based resin (PMMA) having high transmittance in a wavelength region of visible light or polycarbonate (PC) having high transmittance and excellent mechanical strength, may be used as the light guide member 20. In particular, polycarbonate (PC), which may ensure durability even though the light guide film is thin, is more preferable in a case in which the light guide film is used in the form of a film in the exemplary embodiment of the present invention.

A thickness of the light guide film ranges preferably from 0.2 mm to 3.0 mm, and more preferably, the thickness may range from 0.3 mm to 2.0 mm to maintain mechanical durability and ensure high flexibility. The light-transmitting resin film within these ranges may be easily available on the market because the light-transmitting resin film may be easily mass-produced by a method such as rolling without using an expensive process such as injection molding, and as a result, it is possible to greatly reduce manufacturing costs of the lighting member 100.

In addition, as illustrated in FIG. 3, the light incident portion 24 may include one edge surface of the light guide film. Therefore, the first light exit portion 22 may be configured as a linear light source at the other edge surface opposite to one edge surface of the light incident portion 24. Further, the second light exit portion 23 may be configured as a surface light source at one or more lateral sides laterally positioned in the direction in which the light travels from the light incident portion 24 toward the first light exit portion 22.

In particular, in the lighting member 100 according to the exemplary embodiment of the present invention, a concave-convex portion is formed on a surface of the first light exit portion 22 of the light guide member 200, thereby mitigating irregularity of the light emitting pattern on the first light exit portion 22 which is caused by the arrangement of the one or more light emitting diodes 30.

That is, because the light emitting diode 30 is a point light source, the light, which is emitted from the light emitting diode 30 and exits the first light exit portion 22 via the light incident portion 24, may make a non-uniform pattern in which the light is intense at a specific point. However, according to the present invention, the concave-convex portion is formed on the surface of the first light exit portion 22, thereby effectively mitigating irregularity of the light emitting pattern on the first light exit portion 22.

In particular, when using a uniform linear light emitting pattern on the first light exit portion 22, it is possible to effectively achieve a light distribution performance and the like required for automobile lamps such as stop lamps, tail lamps, turn signal lamps, and reversing lamps.

In addition, in the lighting member 100 according to the exemplary embodiment of the present invention, a predetermined pattern is formed on a surface of the second light exit portion 23, such that a part of the light, which enters the light incident portion 24 and travels toward the first light exit portion 22, may effectively exit the second light exit portion 23. Further, the pattern is formed on the surface of the second light exit portion 23 so that a brightness difference is made in a particular direction, such that the light emitting pattern and the like may be more effectively adjusted.

Further, in FIG. 3, the same pattern may be formed on one surface, the surface of the second light exit portion 23a, and the other surface, the surface of the second light exit portion 23b, but the present invention is not limited thereto, and different patterns may be formed on one surface and the other surface. Further, the pattern may be formed so that a brightness difference is made in a particular direction.

Further, in order to improve a surface light emitting property on the second light exit portion 23 (e.g., in order to increase brightness or implement an effect such as a particular pattern or shape), a light guide film or the like having a thickness of 0.1 mm to 2.0 mm may be additionally connected to a left side, a right side, or both sides of the light guide member 20.

Figure 4:
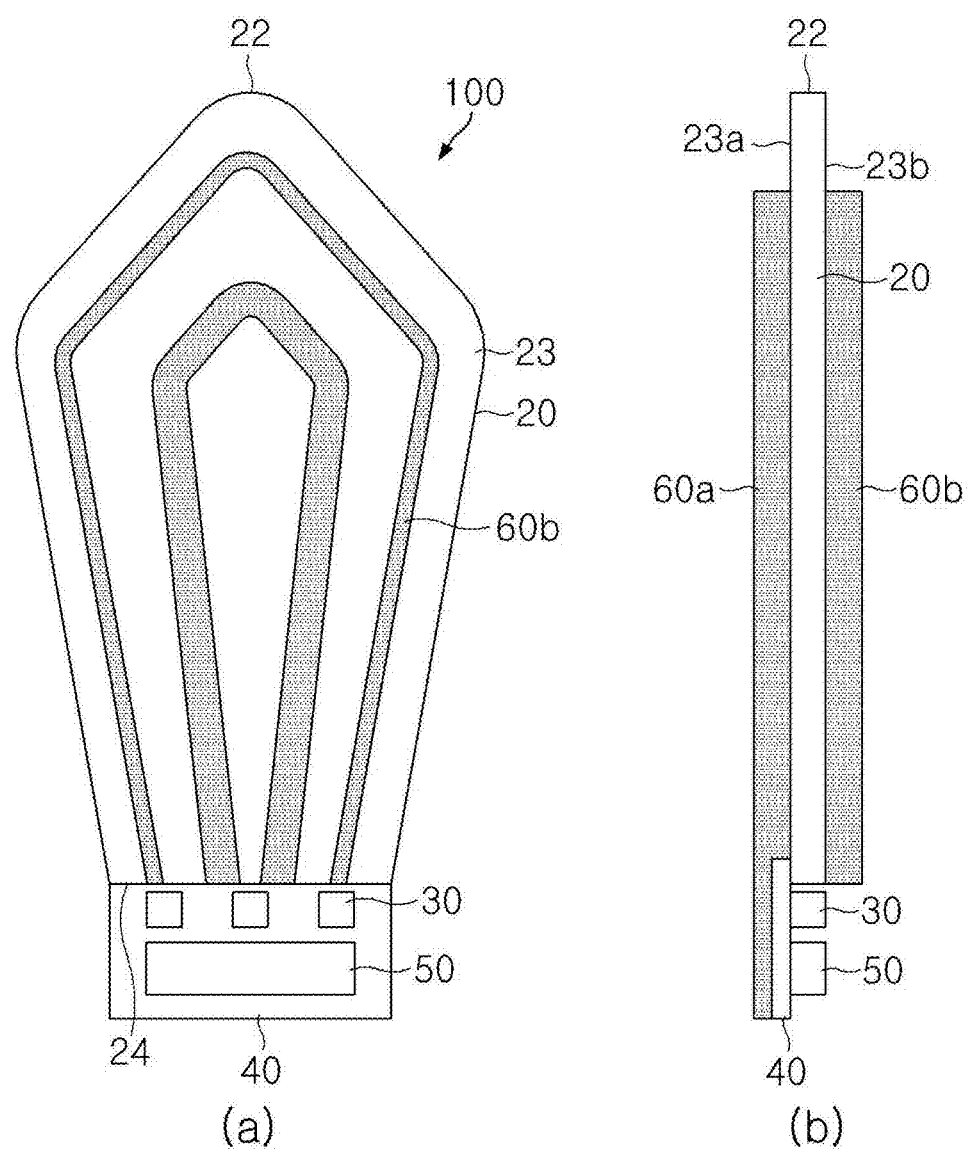
FIG. 4 is a view illustrating the multi-sided luminous lighting member further including a bezel portion according to the exemplary embodiment of the present invention.

FIG. 4 illustrates the multi-sided luminous lighting member 100 further including a bezel portion 60 according to the exemplary embodiment of the present invention. As illustrated in FIG. 4, the multi-sided luminous lighting member 100 according to the exemplary embodiment of the present invention may further include the bezel portion 60 attached to an upper portion, a lower portion, or the upper and lower portions of the light guide member 20, in addition to the one or more light emitting diodes 30, the light guide member 20 configured to guide the light entering from the one or more light emitting diodes 30 and allow the light to exit the respective light emitting surfaces, and the mounting board 40 on which the one or more light emitting diodes 30 are mounted. In this case, the bezel portion 60 may adjust the light emitting pattern on the second light exit portion 23 by using one or more of the shape, color, and surface processes.

For example, the bezel portion 60 is attached to a lateral surface of the light guide member 60, such that the light, which exits in the form of surface light from the second light exit portion 23 (i.e., the lateral surface) of the light guide member 20, partially or totally penetrates or is reflected or refracted by the adjacent bezel portion 60, thereby implementing three-dimensional light.

That is, by using the various shape, color, and surface treatments, the bezel portion 60 converts the light, which is emitted in the form of surface light from the lateral surface of the light guide member 20, to implement a three-dimensional light emitting effect. More specifically, for example, as illustrated in FIG. 4, the bezel portion 60 has a particular shape, thereby changing the simple surface light to the surface light having a particular shape.

In addition, a particular color may be applied to the bezel portion 60 or the bezel portion 60 may function as a reflective plate or a reflective film by performing a matte treatment, a corrosion treatment, or the like on an inner surface of the bezel portion. As necessary, a separate reflective film may be provided to further improve the three-dimensional light emitting effect.

Further, the bezel portion 60 may also function as a housing for fixing the light guide member 20 and the mounting board 40.

The bezel portion 60 may be made of a general injection-molded material, but an additive may be added, or other materials may be used in order to maximize the three-dimensional light emitting effect.

Figure 5:
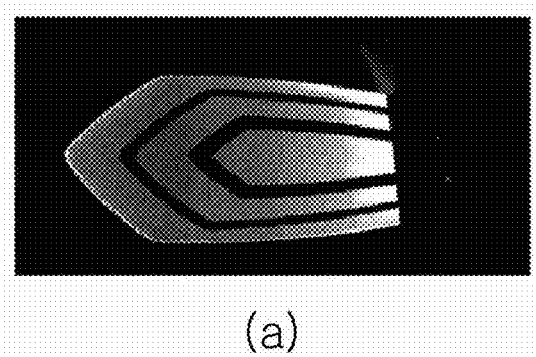
FIG. 5 is a photograph illustrating a light emitting operation of the multi-sided luminous lighting member according to the exemplary embodiment of the present invention.
Figure 5:
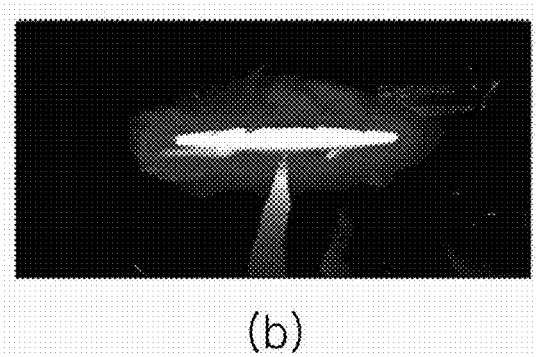
Figure 6A:
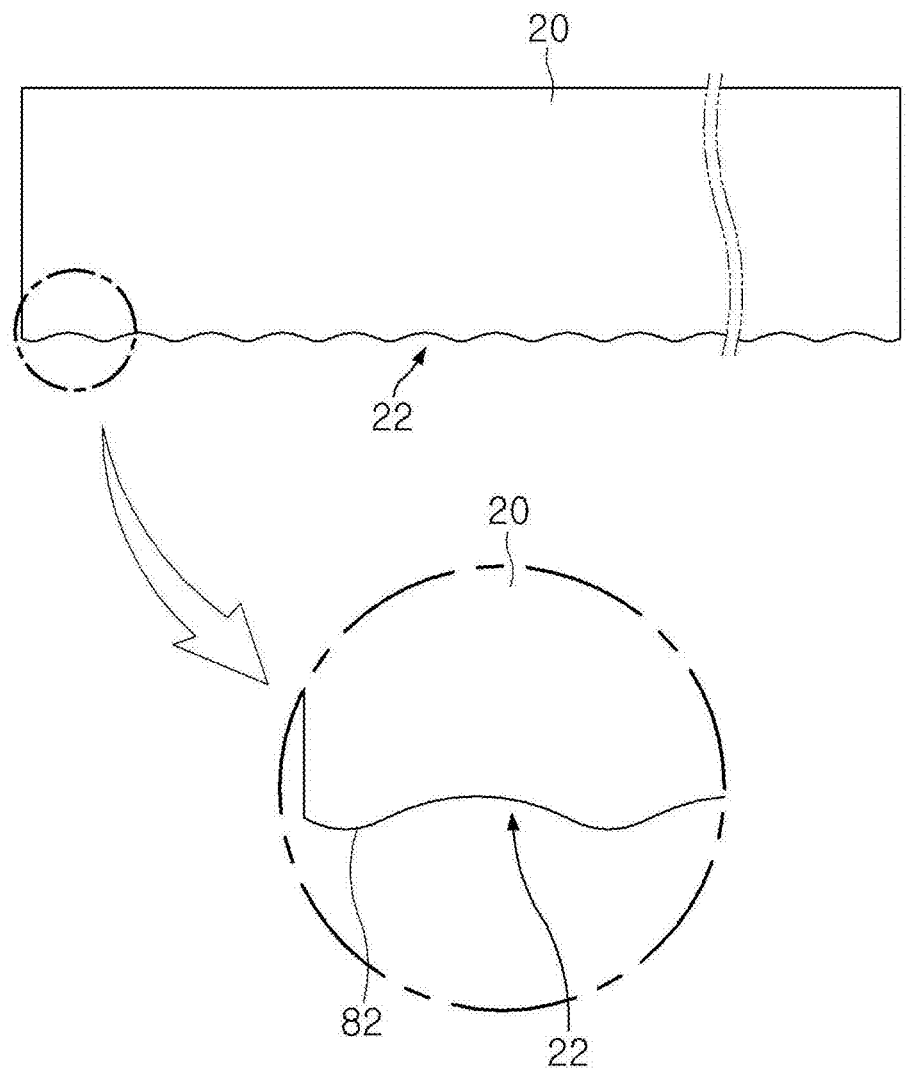
FIGS. 6A to 6E are views for explaining a first light emitting portion of the lighting member according to the exemplary embodiment of the present invention.
Figure 6B:
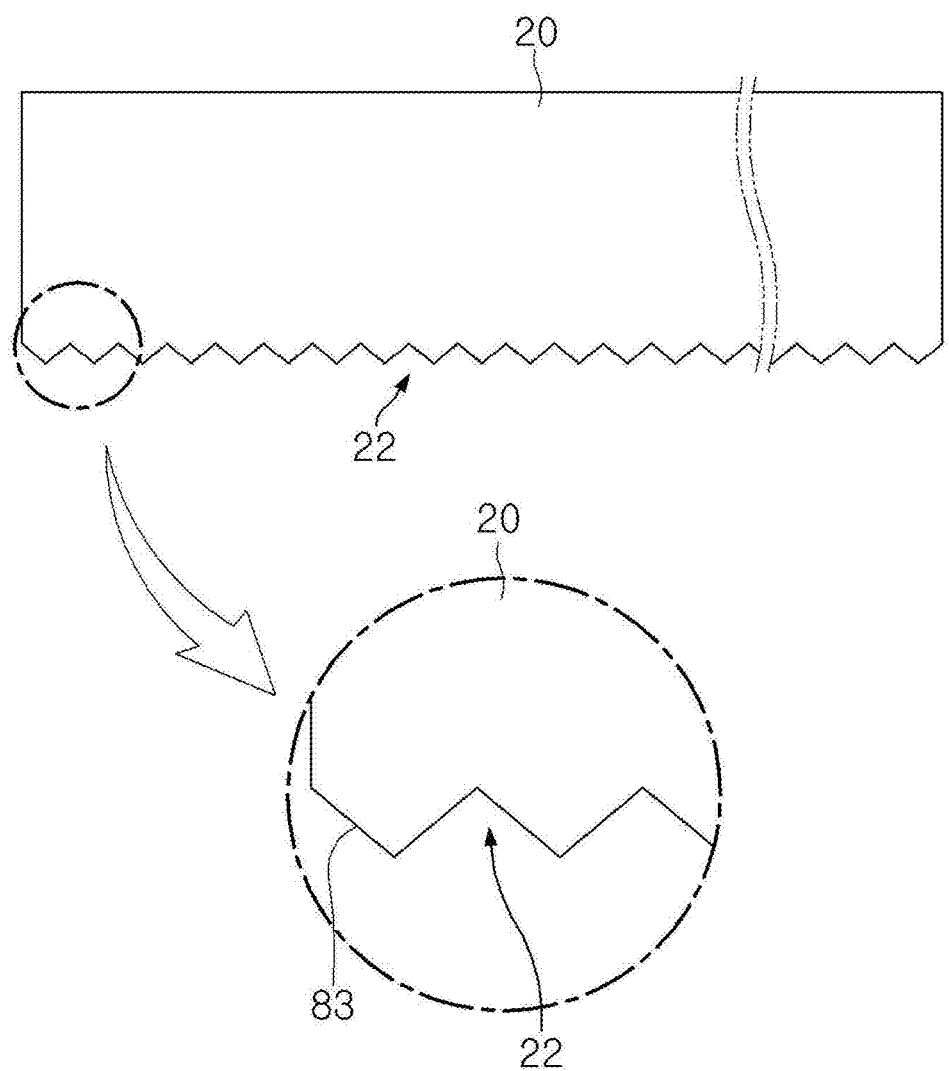
Figure 6C:
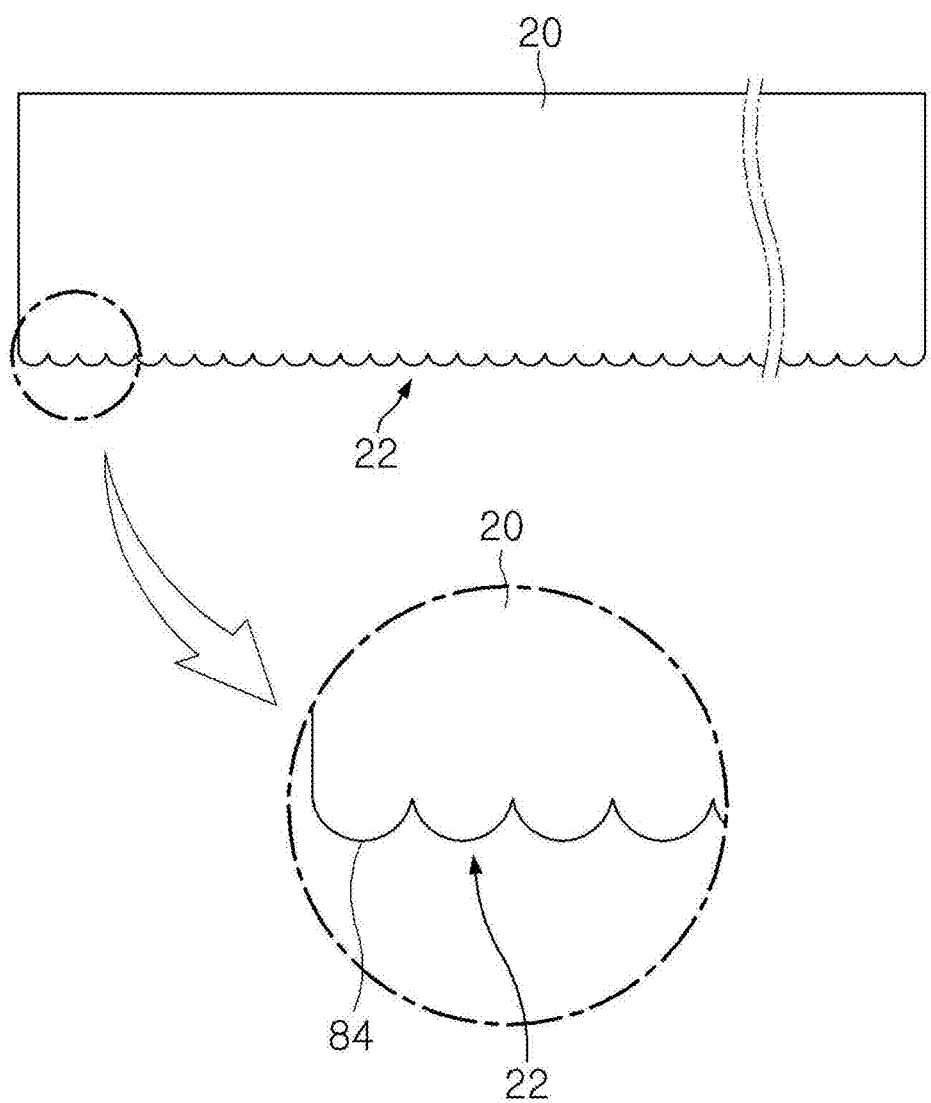
Figure 6D:
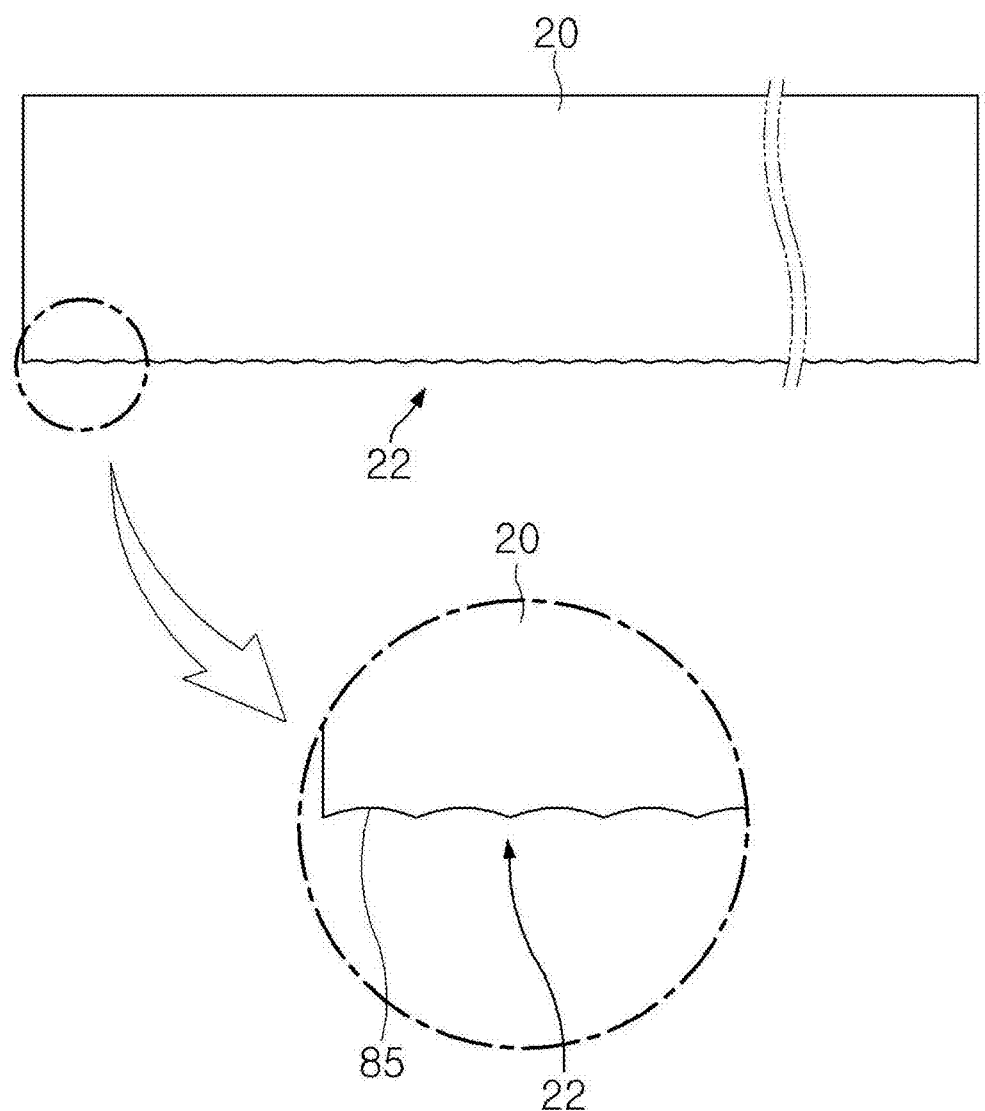
Figure 6E:
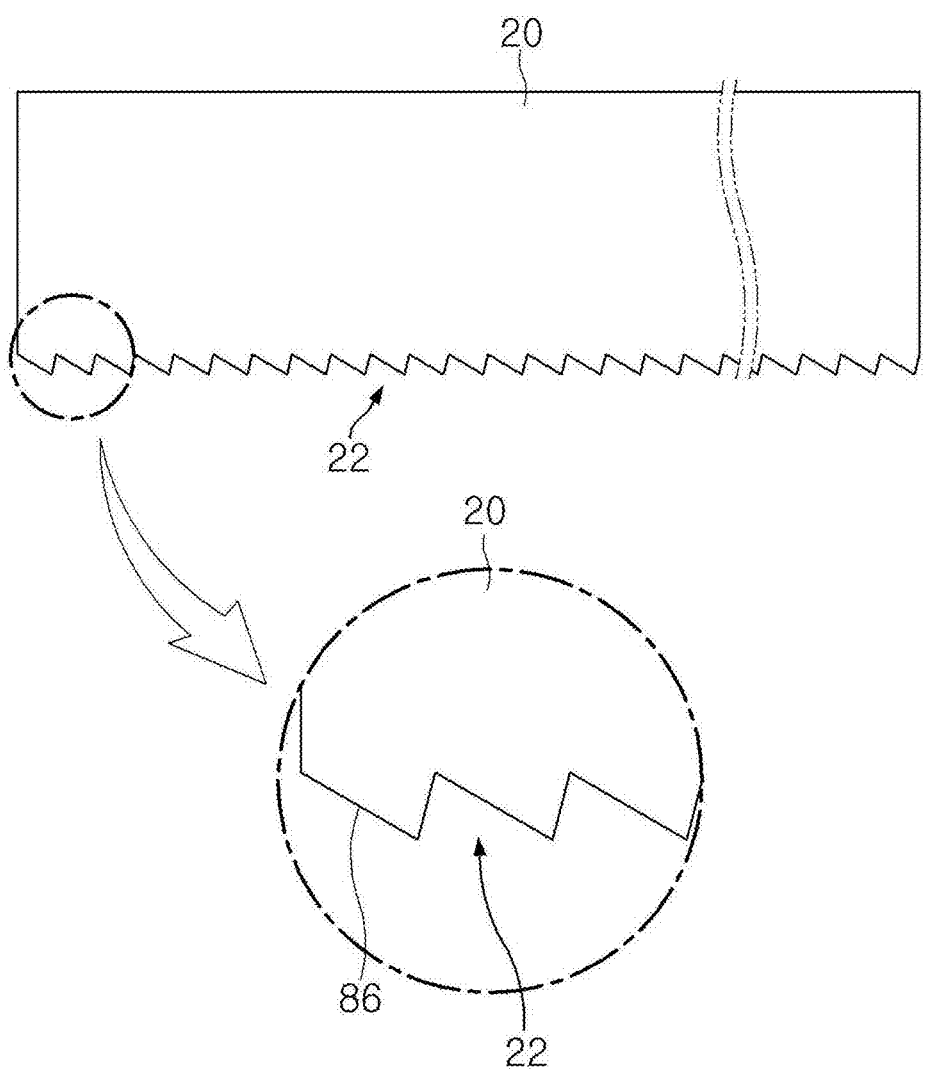

Next, FIG. 5 is a photograph illustrating a light emitting operation of the multi-sided luminous lighting member 100 according to the exemplary embodiment of the present invention. FIG. 5A illustrates a light emitting form on the second light exit portion 23 in the case in which the bezel portion 60 illustrated in FIG. 4 is provided. As illustrated in FIG. 5A, it can be seen that the light, which is emitted in the form of surface light from the second light exit portion 23, is adjusted by the bezel portion 60, thereby finally implementing the light emitting form.

In addition, FIG. 5B illustrates a light emitting form on the first light exit portion 22 of the light guide member 20. It can be seen that a uniform light emitting pattern is made as the irregularity of the light emitting pattern is mitigated by the concave-convex portion formed on the first light exit portion 22.

Therefore, according to the lighting member 100 according to the present invention, it is possible to provide the multi-sided luminous lighting member that simultaneously implements the uniform linear light on the first light exit portion 22 and the surface light on the second light exit portion 23.

Further, the light-transmitting resin film of the light guide member 20 may be cut into an appropriate shape, thereby obtaining the light guide members 20 having various shapes and thicknesses. The light guide member 20 may be cut into various shapes including a rectilinear shape or a curved shape and may also be cut into a more complicated shape. Therefore, the light guide member 20 may be easily processed to be suitable for an interior/exterior structure of the automobile that generally has a complicated three-dimensional structure. In this case, there is an advantage in that mass-production suitability is excellent because no expensive process such as an injection molding process is required. Further, it is possible to allow automobile designers to broaden a range of lighting designs inside/outside the automobile in consideration of various decorative effects and visibility.

Furthermore, only a plate-shaped structure having a predetermined minimum thickness of 3 to 4 mm or more may be manufactured through the injection molding process, and there is a limitation in that the injection molding process cannot manufacture a structure in the form of a thin film. Therefore, with the use of the light guide film 20 obtained by cutting the light-transmitting resin film into an appropriate shape as described in the present invention, it is possible to overcome the limitation of the injection molding process and thus to implement the lighting member 100 including an ultra-slim linear light source with maximized visibility and decorative effects.

Furthermore, the shape of the light guide member 20 may be defined by several cut surfaces (or edges) formed by being cut and separated from the light-transmitting resin film. At least one of the several cut surfaces of the light guide member 20 may be used as the first light exit portion 22, and at least one other cut surface opposite to the first light exit portion 22 among the plurality of cut surfaces may be used as the light incident portion 24.

In addition, the lighting member 100 according to the present invention may include a drive module 50 connected to the mounting board 40 or implemented on the mounting board 40 and configured to electrically operate the one or more light emitting diodes 30. The drive module 50 and the mounting board 40 may be integrated or separately manufactured and then coupled. Likewise, the driving module 50 may be made of the same board material as the mount board 40 or may be made of a board material different from a board material of the mount board 40.

FIGS. 6A to 6E illustrate the lighting members using the light guide members 20 with the various patterns formed on the first light exit portions 22 according to another exemplary embodiment of the present invention. In the illustrated examples, the first light exit portion 22 is formed with a wave-shaped curved surface 82 in FIG. 6A, a triangular cut surface 83 in FIG. 6B, a continuously formed convex surface 84 in FIG. 6C, a continuously formed concave surface 85 in FIG. 6D, or an asymmetric triangular cut surface 20 similar to a serrated shape in FIG. 6E. The pattern structure on the surface of the first light exit portion 22 may be implemented during a process of cutting the light-transmitting resin film or may be formed by a method such as polishing or laser cutting after the cutting process.

Figure 7A:
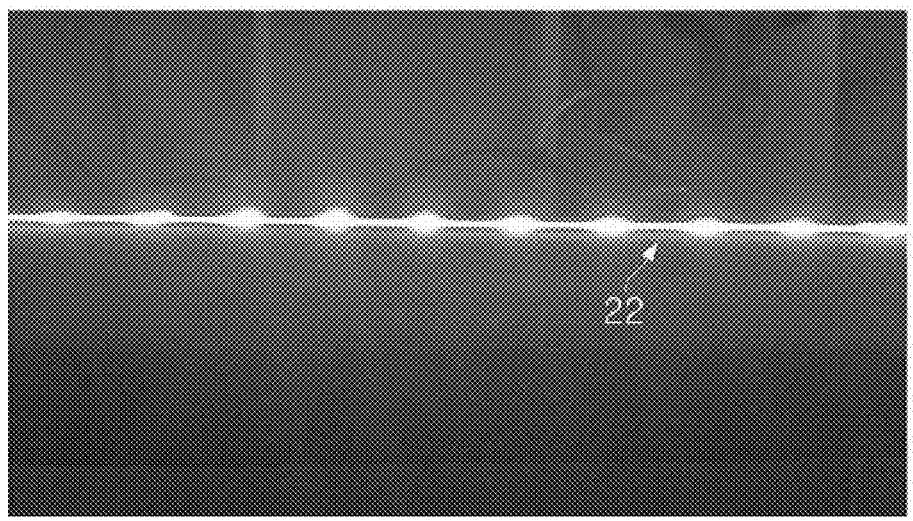
FIGS. 7A to 7C are views for explaining a change in light emitting pattern in accordance with a pattern of a light exit portion.
Figure 7B:
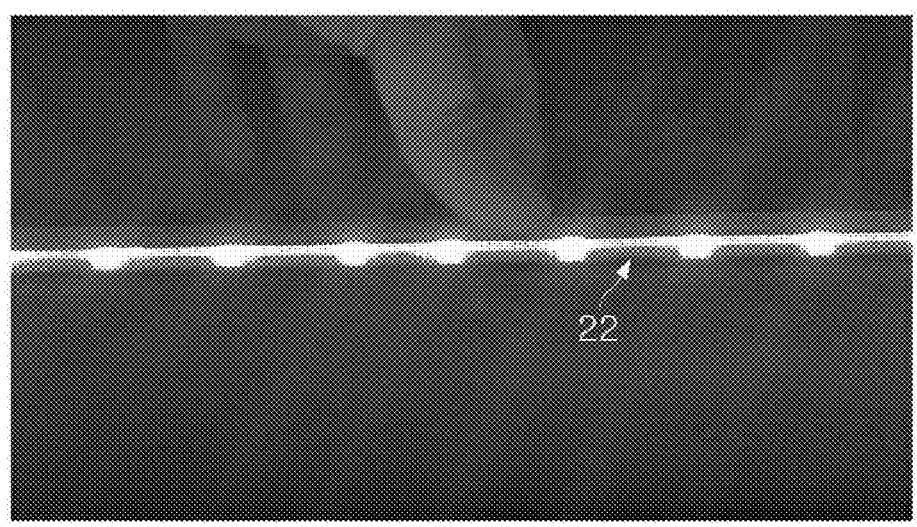
Figure 7C:
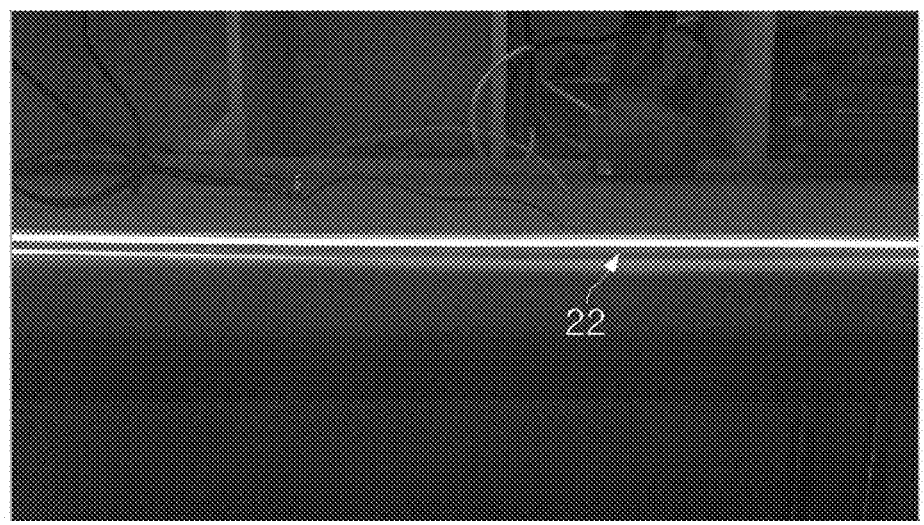

In particular, the present inventors have observed that it is possible to obtain innovative effects in implementing an ideal linear light source when the above-mentioned pattern is implemented on the first light exit portion 22. FIGS. 7A to 7C are views for explaining a change in light emitting pattern in accordance with a pattern of the first light exit portion 22.

In the lighting member 100 according to the exemplary embodiment of the present invention, the light incident portion 24 and the first light exit portion 22 of the light guide member 20 are opposite to each other, such that the light entering through the light incident portion 24 is provided to the first light exit portion 22 with high light-transmitting efficiency. However, it is difficult to ensure a uniform light emitting pattern because this structure has a problem in that a light pattern made based on the arrangement of the light emitting diodes 30 is reflected directly on the light exit portion if the arrangement intervals between the light emitting diodes 30 are not very narrow.

FIG. 7A is a photograph made by capturing a light emitting pattern observed at the first light exit portion 22 in the case in which the plurality of light emitting diodes 30 is disposed to be spaced apart from one another and the light incident portion 24 and the first light exit portion 22 are configured to have a flat surface without forming a pattern. In this case, light emitting spots made based on the arrangement positions of the multiple light emitting diodes 30 are reflected directly on the first light exit portion 22, and as a result, uniformity of the light emitting pattern is not good. In this situation, in order to improve uniformity of the light emitting pattern, a separate component such as a light diffusion plate needs to be used or the number of light emitting diodes needs to be increased so that the light emitting diodes are more densely arranged, which causes an increase in component costs.

FIG. 7B is a photograph made by capturing a light emitting pattern observed at the first light exit portion 22 in the case in which a pattern is formed at the light incident portion 24 when the other structures as illustrated in FIG. 7A remain the same. Even in this case, like the case illustrated in FIG. 7A, light emitting spots made based on the arrangement positions of the multiple light emitting diodes 30 are reflected directly on the first light exit portion 22, and as a result, uniformity of the light emitting pattern is not good.

In contrast, FIG. 7C is a photograph made by capturing a light emitting pattern observed at the first light exit portion 22 in the case in which a pattern is formed on the light exit portion 24 when the other structures as illustrated in FIG. 7A remain the same. In this case, as illustrated, the light emitting spots made based on the arrangement positions of the multiple light emitting diodes 30 are rarely observed, and an ideal linear light source having an entirely and very uniform light emitting pattern may be implemented in a case in which the light emitting diodes 30 are not densely arranged.

In the case of the exemplary embodiment in which the pattern is formed on the first light exit portion 22 as described above, it is possible to obtain an effect of making a light emitting pattern uniform in a direction parallel to the light guide member 20 even though the light guide member 20 of the lighting member 100 has a thickness to some extent. Because this property is a property separate from flexibility of the light guide member 20, the light guide member 20 need not necessarily be obtained by the process of cutting the light-transmitting resin film, and a sheet or board, which is formed by a method such as injection molding like the related art, may be applied.

In particular, a length from the light incident portion 24 to the first light exit portion 22 of the light guide member 20 is set to 8 mm to 250 mm, and as a result, it is possible to satisfy a technical standard (e.g., light amount, etc.) that needs to be satisfied by the lighting member, and it is possible to effectively implement uniformity of the light emitting pattern of the light guide member 20 in the case in which the lighting member to be provided in the automobile is implemented by using the light guide member 20 according to the exemplary embodiment of the present invention. More specifically, in the lighting member according to the exemplary embodiment of the present invention, in a case in which a length of the light guide member 20 is set to 8 mm to 250 mm, it is possible to implement an ideal linear light source having an entirely and very uniform light emitting pattern at the first light exit portion 22 of the light guide member 20.

Mode for Invention

Figure 8A:
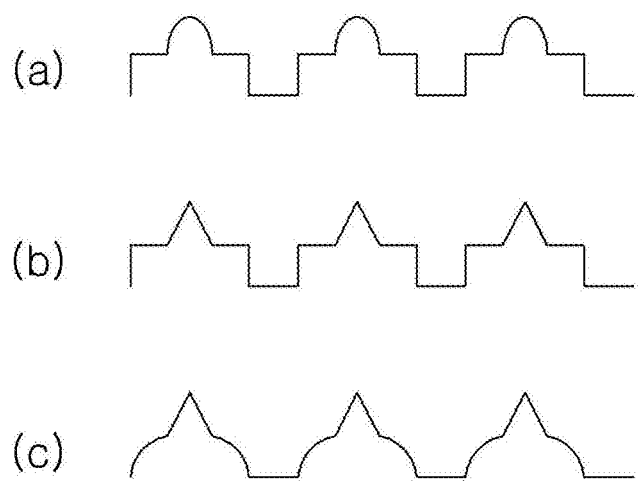
FIGS. 8A and 8B are views illustrating a first light exit portion having a plurality of patterns repeatedly formed at predetermined intervals according to another exemplary embodiment of the present invention.
Figure 8B:
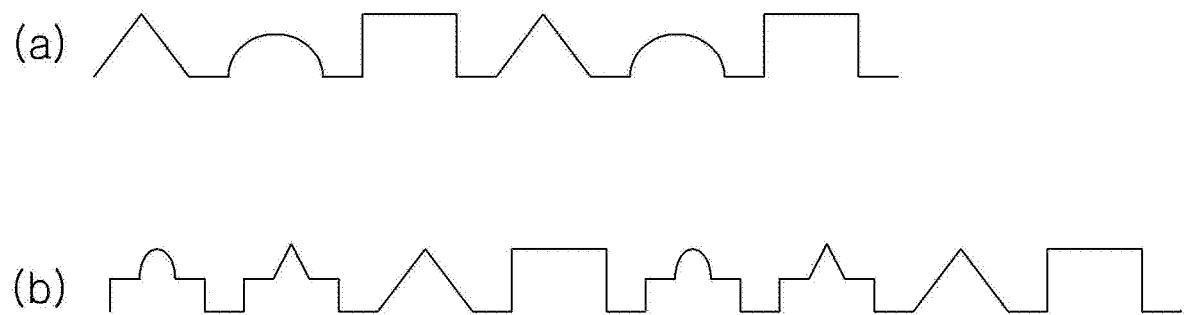

In addition, FIGS. 8A and 8B illustrate a shape of the first light exit portion 22 of the light guide member 20 in which a plurality of patterns is repeatedly formed at predetermined intervals according to still another exemplary embodiment of the present invention.

The case in which non-uniformity of the light emitting pattern is mitigated by repeatedly forming one pattern has been described above as an example with reference to FIGS. 6A to 6E, but the present invention is not limited thereto, and various patterns may be employed in addition to the case.

More specifically, FIG. 8A illustrates (a) a case in which a pattern having a shape made by stacking a semicircle on a quadrangle is used, (b) a case in which a pattern having a shape made by stacking a triangle on a quadrangle is used, and (c) a case in which a pattern having a shape made by stacking a triangle on a semicircle is used.

Furthermore, FIG. 8B illustrates (a) a case in which a pattern having a shape made by sequentially arranging a triangle, a semicircle, and a quadrangle is used, and (b) a case in which a pattern having a shape made by stacking a semicircle on a quadrangle, a shape made by stacking a triangle on a quadrangle, and a shape made by sequentially arranging a triangle and a quadrangle is used.

As described above, it is possible to improve uniformity of the light emitting pattern described with reference to FIGS. 6A to 6E by stacking the several shapes or repeatedly arranging the multiple shapes in a predetermined cycle as illustrated in FIGS. 8A and 8B. Furthermore, it is possible to form a predetermined lighting pattern by forming a point by increasing the light amount at a particular position or changing the light amount in accordance with the position. In particular, in the related art, to increase the light amount at a particular point or form a predetermined lighting pattern as described above, a separate lens needs to be provided, which may cause a complicated structure and an increase in manufacturing costs. However, in the present invention, it is possible to effectively implement various lighting patterns without a separate lens.

Figure 9A:
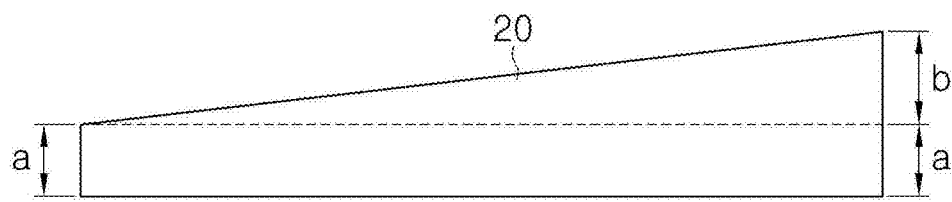
FIGS. 9A to 9C are views illustrating a light guide film having a tapered cross section and a lighting member using the light guide film according to another exemplary embodiment of the present invention.
Figure 9B:
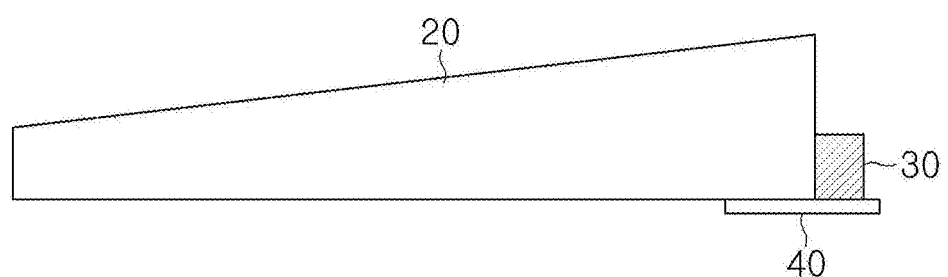
Figure 9C:
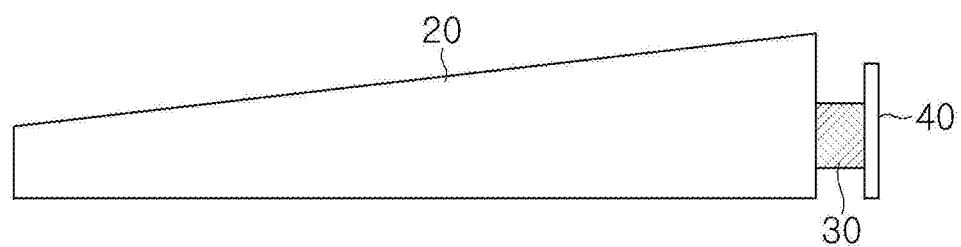

In addition, FIGS. 9A to 9C illustrate the light guide members 20 having tapered cross sections and the lighting members using the light guide members 20 according to yet another exemplary embodiment of the present invention.

The light guide member 20 having a uniform thickness (e.g., the light guide member 20 in FIG. 3) has been mainly described above as the exemplary embodiment of the present invention, but the present invention is not necessarily limited thereto, and the light guide member 20 according to the exemplary embodiment of the present invention may have a tapered cross section as illustrated in FIG. 9A.

More specifically, FIG. 9A illustrates that one side of the light guide member 20 has a small thickness a (e.g., 0.3 mm=a≤3 mm), but the other side of the light guide member 20 may have a tapered cross section having a larger thickness (a+b) (e.g., 0.3 mm<a+b=10 mm).

In particular, if the thickness of the light guide member 20 having the uniform thickness cannot reach at least 3 to 4 mm, it is difficult to manufacture the light guide member 20 through the injection molding process. However, in the case in which the light guide member 20 according to the exemplary embodiment of the present invention has the tapered cross section, it is possible to manufacture the light guide member 20 by using the injection molding process in the case in which the other side of the light guide member 20 has the large thickness (a+b) of 3 to 4 mm or more even though the thickness a of one side of the light guide member 20 cannot reach 3 to 4 mm.

Therefore, in the exemplary embodiment of the present invention, it is possible to manufacture the light guide member 20 having the tapered cross section by applying the injection molding process and using an appropriate material such as acrylic-based resin (PMMA) or polycarbonate (PC).

In addition, FIGS. 9B and 9C illustrate the lighting member 100 using the light guide member 20 having the tapered cross section according to the exemplary embodiment of the present invention.

As described above with reference to FIG. 3, the light emitting diode 30, which may be employed in accordance with the thickness of the light guide member 20, may be limited in the case in which the light guide member 20 having the uniform thickness is used (e.g., a side-view light emitting diode (LED) is used to allow the light guide member 20 to have a thickness of 3 mm). In contrast, in the case in which the light guide member 20 having the tapered cross section according to the exemplary embodiment of the present invention is used, the side-view light emitting diode (LED) may be used as illustrated in FIG. 9B, and a top-view light emitting diode (LED) may be easily employed as illustrated in FIG. 9C. Therefore, it is possible to obtain more excellent heat dissipation properties and light amount properties and to select the more inexpensive light emitting diode 30, such that it is possible to more effectively improve a performance of the lighting member 100.

In addition, although not illustrated in FIGS. 9B and 9C, a coupling member (not illustrated) for fixing the light emitting diode 30, the mounting board 40, and the light guide member 20 may be provided.

Figure 10A:
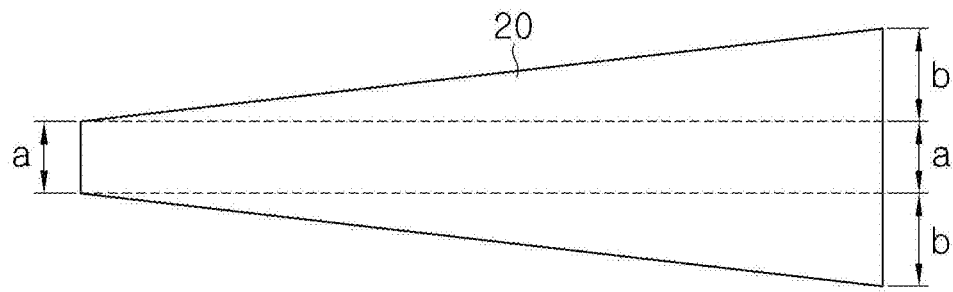
FIGS. 10A to 10C are views illustrating light guide films having various tapered cross sections according to another exemplary embodiment of the present invention.
Figure 10B:
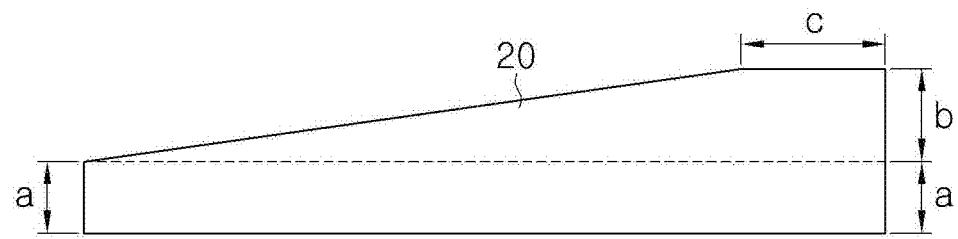
Figure 10C:
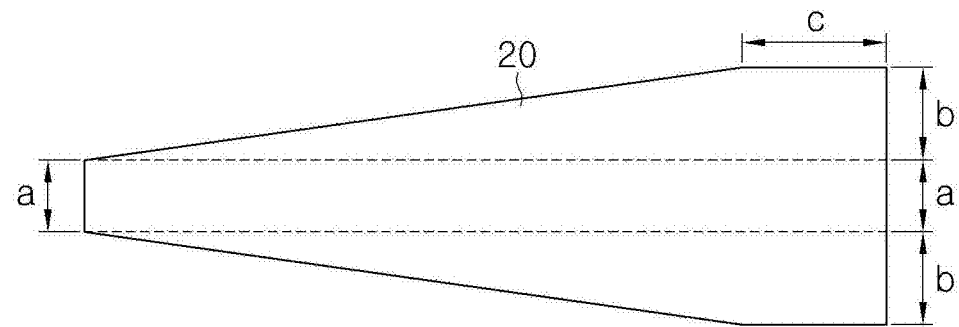

Furthermore, the light guide member 20 according to the exemplary embodiment of the present invention may have more various tapered cross sections. FIGS. 10A to 10C illustrate the light guide members 20 having various tapered cross sections according to another exemplary embodiment of the present invention.

First, an upper surface of the light guide member 20 may have a tapered shape as illustrated in FIG. 9A, or both of the upper and lower surfaces of the light guide member 20 may have tapered shapes as illustrated in FIG. 10A. Furthermore, as illustrated in FIGS. 10B and 10C, the light guide member 20 may include a section having a uniform thickness (section c in FIGS. 10B and 10C) in addition to the section having the tapered shape.

As described above, the light guide member 20 according to the exemplary embodiment of the present invention may have various tapered cross sections, and as a result, it is possible to implement the lighting member 100 with the further improved structure and properties, and the light guide member 20 may be manufactured even by the injection molding process.

Figure 11:
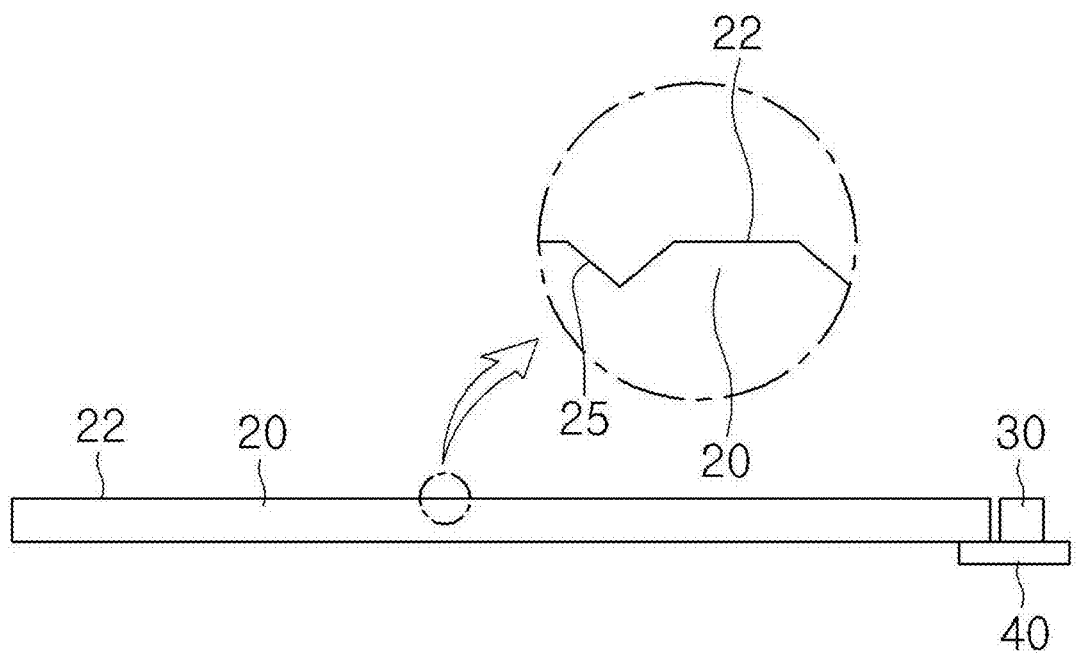
FIG. 11 is a view illustrating a pattern formed on a surface of a second light exit portion of a light guide member according to the exemplary embodiment of the present invention.

In addition, FIG. 11 illustrates a pattern 25 formed on a surface of the second light exit portion 23 of the light guide member 20 according to the exemplary embodiment of the present invention. That is, as illustrated in FIG. 11, the predetermined pattern 25 is formed on the surface of the second light exit portion 23, such that a part of the light, which enters the light incident portion 24 and travels toward the first light exit portion 22, exits the second light exit portion 23.

In addition, the pattern 25 is formed on the surface of the second light exit portion 23 so that a brightness difference is made in a particular direction, such that a three-dimensional optical pattern may be more effectively formed.

Further, FIG. 11 illustrates that the triangular pattern is formed on the surface of the second light exit portion 23, but the present invention is not limited thereto, patterns having various shapes and sizes may be used.

Figure 12:
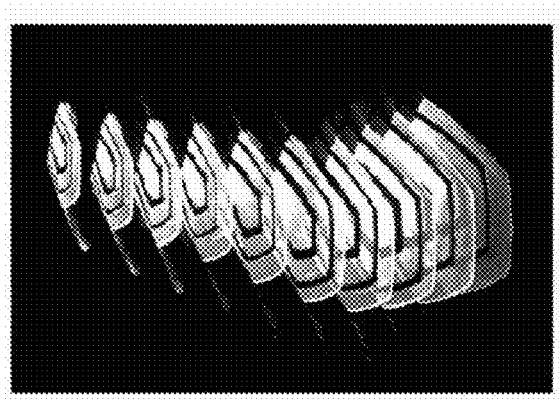
FIG. 12 is a photograph illustrating a light emitting operation of a three-dimensional lighting device implemented by arranging the plurality of lighting members according to the exemplary embodiment of the present invention.
Figure 12:
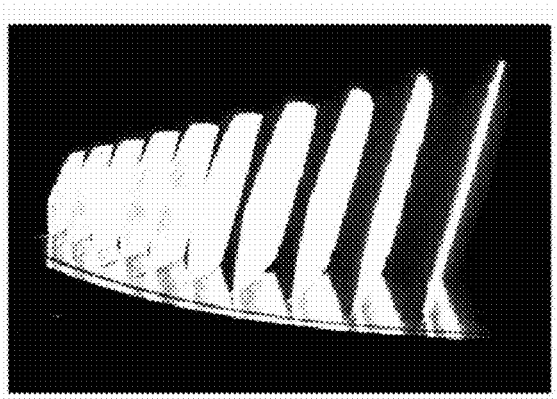

In addition, FIG. 12 is a photograph illustrating a structure and a light emitting operation of a three-dimensional lighting device implemented by arranging the plurality of lighting members 100 according to the exemplary embodiment of the present invention. More specifically, as illustrated in FIG. 12, the three-dimensional lighting device according to the exemplary embodiment of the present invention is implemented by arranging the plurality of multi-sided luminous lighting members 100, thereby more effectively implementing the three-dimensional light emitting pattern.

Furthermore, the three-dimensional lighting device according to the exemplary embodiment of the present invention further includes a control unit (not illustrated) capable of individually controlling and sequentially operating the plurality of arranged lighting members 100 or the light emitting diodes 30 included in the plurality of lighting members 100, thereby implementing the lighting device that may add patterns, which vary over time, to the three-dimensional light emitting pattern.

Figure 13:
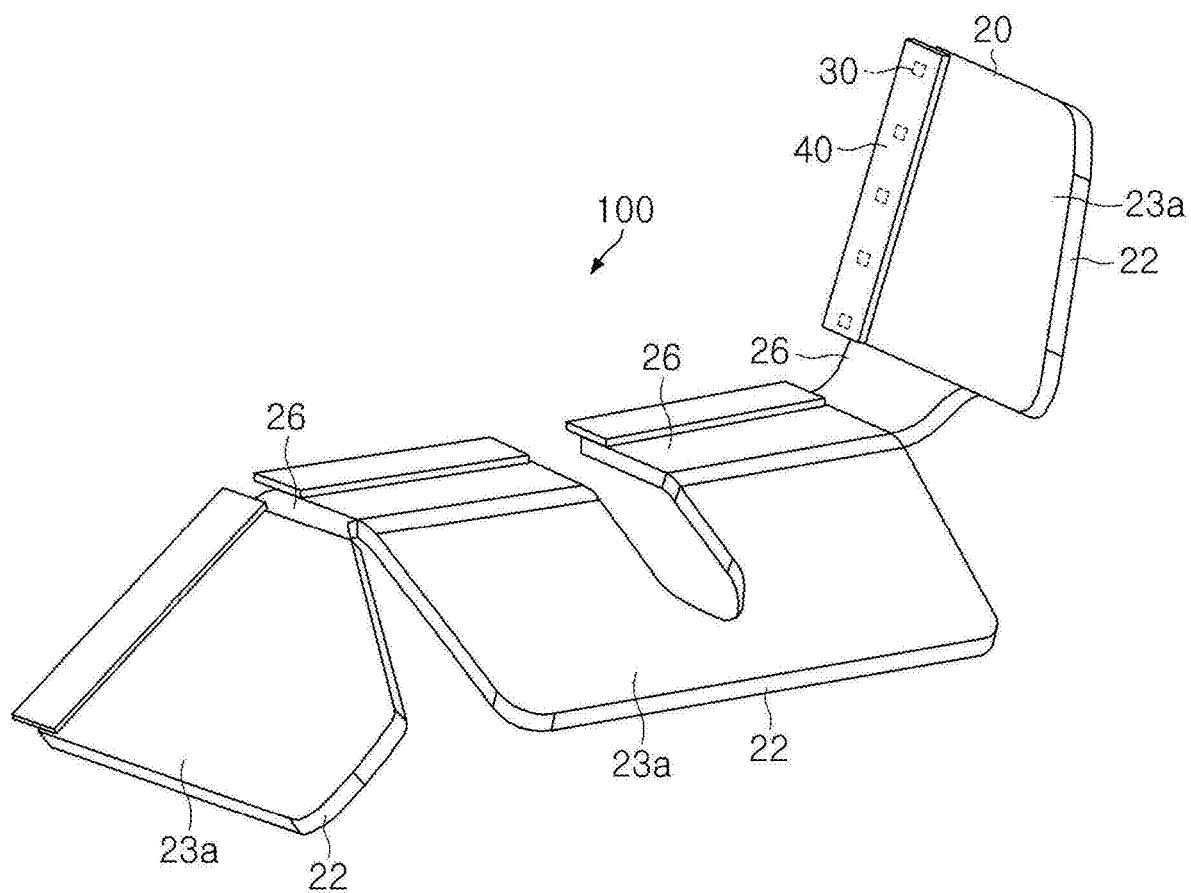
FIG. 13 is a view illustrating a light guide member including a curved portion according to the exemplary embodiment of the present invention.

In addition, FIG. 13 illustrates a light guide member 20 including a curved portion 26 according to the exemplary embodiment of the present invention. That is, as illustrated in FIG. 13, the light guide member 20 may have various three-dimensional shapes as the light guide member 20 has the curved portion 26 which may be bent at a predetermined angle, such that it is possible to effectively implement the lighting member 100 having various three-dimensional light emitting patterns.

In addition, a method of manufacturing the lighting member 100 according to another exemplary embodiment of the present invention may include: forming a light guide member 20 which is a light-transmitting light guide member 20 having a plurality of light emitting surfaces and has a light incident portion 24 which is at least one of the plurality of light emitting surfaces, a first light exit portion 22 which is at least one other light emitting surface opposite to the light incident portion 24 among the plurality of light emitting surfaces, and a second light exit portion 23 which is at least one other light emitting surface positioned laterally in a direction in which light entering the light incident portion 24 travels toward the first light exit portion 22, such that the first light exit portion 22 and the second light exit portion 23 emit the light that has entered the light incident portion 22; disposing the one or more light emitting diodes 30 on the mounting board 40 adjacent to the light incident portion 24 to allow the light to enter the light incident portion 24; coupling the light guide member 20 to the mounting board 40 having a surface on which the one or more light emitting diodes 30 is disposed; and connecting the drive module 50, which is configured to electrically operate the plurality of light emitting diodes 30, to the mounting board 40.

In this case, in the forming of the light guide member, the light guide member 20 may be formed by cutting and separating a flexible light-transmitting resin film or injection-molding light-transmitting resin.

The exemplary embodiments described in the present specification and the drawings are just illustrative but not intended to limit the scope of the present invention in any manner. In addition, line connections or connecting members between constituent elements illustrated in the drawings illustratively indicate functional connections, physical connections, and/or connections between circuits and may be represented as replaceable or additional and various functional connections, physical connections, and/or connections between circuits in an actual apparatus. In addition, a constituent element, which is not specifically mentioned together with the term such as "essentially" or "importantly", may not be a constituent element required to be necessarily applied to the present invention.

The term "the" and indicative terms similar thereto used in the specification (particularly, claims) of the present invention may be used for both singular expressions and plural expressions. In addition, in a case in which a range is disclosed in the present invention, individual values falling into the range are applied to the present invention (unless disclosed to the contrary), and the range is identical to the individual values described in the detailed description of the invention. In addition, the steps, which constitute the method, in the present invention, are not intended to necessarily limit the order of the sequence, the order may be appropriately changed as necessary as long as any one step need not be performed necessarily prior to the other steps because of the nature of each process. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. In addition, it can be understood by those skilled in the art that the present invention may be configured based on the claims to which various modifications, combinations, and alterations are added or based on design conditions and elements within the scope equivalent to the scope of the claims.

What is claimed is:

1. A lighting member comprising:
a light guide member which is a multi-sided light-transmitting light guide member having a plurality of surfaces and has a light incident portion which is at least one of the plurality of surfaces, a first light exit portion which is at least one other surface opposite to the light incident portion among the plurality of surfaces, and a second light exit portion which is at least one other surface positioned laterally in a direction in which light entering the light incident portion travels toward the first light exit portion, such that the first light exit portion and the second light exit portion emit the light that has entered the light incident portion;
a plurality of light emitting diodes disposed at predetermined intervals adjacent to the light incident portion to allow the light to enter the light incident portion;
a mounting board connected to the light guide member and having a surface on which the plurality of light emitting diodes are disposed, and
a bezel portion attached to an upper or lower surface of the light guide member,
wherein a concave-convex portion is formed on a surface of the first light exit portion to mitigate irregularity of a light emitting pattern on the first light exit portion which is caused by the intervals between the plurality of light emitting diodes at the light incident portion,
wherein the bezel portion adjusts a light emitting pattern on the second light exit portion by using one or more shape, color, and surface treatments.

2. The lighting member of claim 1, wherein a predetermined pattern is formed on a surface of the second light exit portion to emit a part of the light that enters the light incident portion and travels toward the first light exit portion.

3. The lighting member of claim 2, wherein a pattern is formed on a surface of the second light exit portion so that a brightness difference is made in a particular direction.

4. The lighting member of claim 1, wherein the bezel portion fixes the light guide member and the mounting board.

5. The lighting member of claim 1, wherein the bezel portion has a reflective surface configured to reflect the light exiting the second light exit portion.

6. The lighting member of claim 1, wherein the light guide member is a light guide film having a thickness of 0.1 mm to 4.0 mm.

7. The lighting member of claim 1, wherein the light guide member is an injection-molded light guide film having a thickness of 2.0 mm to 20.0 mm.

8. The lighting member of claim 1, wherein the light incident portion faces the plurality of light emitting diodes, and the first light exit portion is positioned at a side opposite to a side of the light incident portion on a plane of the light guide member.

9. The lighting member of claim 1, wherein concave-convex portions having one or two or more shapes are repeatedly disposed at predetermined intervals on the surface of the first light exit portion.

10. A three-dimensional lighting device which implements a three-dimensional light emitting pattern by arranging the plurality of lighting members according to claim 1.

11. The three-dimensional lighting device of claim 10, further comprising:
a control unit configured to individually control and sequentially operate the plurality of arranged lighting members.

12. A lighting member comprising:
a light guide member which is a multi-sided light-transmitting light guide member having a plurality of surfaces and has a light incident portion which is at least one of the plurality of surfaces, a first light exit portion which is at least one other surface opposite to the light incident portion among the plurality of surfaces, and a second light exit portion which is at least one other surface positioned laterally in a direction in which light entering the light incident portion travels toward the first light exit portion, such that the first light exit portion and the second light exit portion emit the light that has entered the light incident portion;
a plurality of light emitting diodes disposed at predetermined intervals adjacent to the light incident portion to allow the light to enter the light incident portion; and
a mounting board connected to the light guide member and having a surface on which the plurality of light emitting diodes are disposed,
wherein a concave-convex portion is formed on a surface of the first light exit portion to mitigate irregularity of a light emitting pattern on the first light exit portion which is caused by the intervals between the plurality of light emitting diodes at the light incident portion,
wherein the light guide member comprises a light guide film, the light incident portion comprises one edge surface of the light guide film, the first light exit portion implements a linear light source, and the second light exit portion implements a surface light source,
wherein a thickness of the light guide film at a side of the first light exit portion and a thickness of the light guide film at a side of the light incident portion are different from each other,
wherein the light guide film has a tapered cross section, and a thickness of the light guide film at a side of the first light exit portion is greater than a thickness of the light guide film at a side of the light incident portion.

13. The lighting member of claim 12, wherein the light guide film comprises a curved portion bent at a predetermined angle.

14. A method of manufacturing a lighting member, the method comprising:
forming a light guide member which is a multi-sided light-transmitting light guide member having a plurality of surfaces and has a light incident portion which is at least one of the plurality of surfaces, a first light exit portion which is at least one other surface opposite to the light incident portion among the plurality of surfaces, and a second light exit portion which is at least one other surface positioned laterally in a direction in which light entering the light incident portion travels toward the first light exit portion, such that the first light exit portion and the second light exit portion emit the light that has entered the light incident portion;

disposing a plurality of light emitting diodes at predetermined intervals on a mounting board adjacent to the light incident portion to allow the light to enter the light incident portion;

coupling the light guide member to the mounting board having a surface on which the plurality of light emitting diodes is disposed; and connecting the mounting board to a drive module configured to electrically operate the plurality of light emitting diodes, wherein a concave-convex portion is formed on a surface of the first light exit portion to mitigate irregularity of a light emitting pattern on the first light exit portion which is caused by the intervals between the plurality of light emitting diodes at the light incident portion, wherein in the forming of the light guide member, the light guide member is formed by cutting and separating a flexible light-transmitting resin film.

15. A method of manufacturing a lighting member, the method comprising:

forming a light guide member which is a multi-sided light-transmitting light guide member having a plurality of surfaces and has a light incident portion which is at least one of the plurality of surfaces, a first light exit portion which is at least one other surface opposite to the light incident portion among the plurality of surfaces, and a second light exit portion which is at least one other surface positioned laterally in a direction in which light entering the light incident portion travels toward the first light exit portion, such that the first light exit portion and the second light exit portion emit the light that has entered the light incident portion;

disposing a plurality of light emitting diodes at predetermined intervals on a mounting board adjacent to the light incident portion to allow the light to enter the light incident portion;

coupling the light guide member to the mounting board having a surface on which the plurality of light emitting diodes is disposed; and connecting the mounting board to a drive module configured to electrically operate the plurality of light emitting diodes, wherein a concave-convex portion is formed on a surface of the first light exit portion to mitigate irregularity of a light emitting pattern on the first light exit portion which is caused by the intervals between the plurality of light emitting diodes at the light incident portion, wherein in the forming of the light guide member, the light guide member is formed by injection-molding light-transmitting resin.

* * * * *